(12) United States Patent
Appel et al.

(10) Patent No.: US 9,656,361 B2
(45) Date of Patent: May 23, 2017

(54) DUST REMOVAL SYSTEM FOR A HANDHELD POWER TOOL

(71) Applicant: Hilti Aktiengesellschaft, Schaan (LI)

(72) Inventors: Hans Appel, Munich (DE); Quirin Wahle, Munich (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 14/891,899

(22) PCT Filed: May 14, 2014

(86) PCT No.: PCT/EP2014/059825
§ 371 (c)(1),
(2) Date: Nov. 17, 2015

(87) PCT Pub. No.: WO2014/184230
PCT Pub. Date: Nov. 20, 2014

(65) Prior Publication Data
US 2016/0114448 A1    Apr. 28, 2016

(30) Foreign Application Priority Data
May 17, 2013    (EP) ..................... 13168219

(51) Int. Cl.
*A47L 7/00*    (2006.01)
*B23Q 11/00*    (2006.01)
(Continued)

(52) U.S. Cl.
CPC ............ *B23Q 11/0071* (2013.01); *A47L 5/22* (2013.01); *A47L 7/0095* (2013.01); *A47L 9/02* (2013.01);
(Continued)

(58) Field of Classification Search
CPC ........ B23Q 11/0071; A47L 5/22; A47L 9/102; A47L 9/12; A47L 9/02; A47L 7/0095; A47L 9/122; A47L 9/10
(Continued)

(56) References Cited

U.S. PATENT DOCUMENTS 5,066,319 A    11/1991    Lippold
6,101,666 A    8/2000    Cheng
(Continued)

FOREIGN PATENT DOCUMENTS

CN    1310655 A    8/2001
CN    1362905 A    8/2002
(Continued)

*Primary Examiner* — David Redding
(74) *Attorney, Agent, or Firm* — Davidson, Davidson & Kappel, LLC

(57) ABSTRACT

A dust removal system handheld power tool includes a fan (18) to generate an air flow (19), a suction nozzle (27) to capture dust-laden air from a tool (4), and a collecting container (22) to collect the dust. The collecting container (22) has a suction opening (27) connected to the suction nozzle (27) as well as an exhaust opening (28) connected to the fan (18). A filter (29) serves to separate dust into the collecting container (22) and is arranged so as to cover the exhaust opening (28). The filter (29) has several consecutive fins (18) arranged one beside the other in a direction (y) that is perpendicular to the direction (z) of the air flow (19). The fins (18) are slanted with respect to each other. The slant (42) of the fins (44) reduces the adhesion of the dust to the fins (44).

4 Claims, 4 Drawing Sheets

(51) Int. Cl.
 *A47L 9/12* (2006.01)
 *A47L 5/22* (2006.01)
 *A47L 9/02* (2006.01)
 *A47L 9/10* (2006.01)

(52) U.S. Cl.
 CPC ............... *A47L 9/102* (2013.01); *A47L 9/12* (2013.01); *A47L 9/122* (2013.01)

(58) Field of Classification Search
 IPC ................................................ A47L 7/00,9/10
 See application file for complete search history.

(56) References Cited

U.S. PATENT DOCUMENTS

| | | |
|---|---|---|
| 6,514,131 B1 | 2/2003 | Reich et al. |
| 7,354,226 B2 | 4/2008 | Britz |
| 2002/0152731 A1 | 10/2002 | Reich et al. |
| 2005/0281627 A1 | 12/2005 | Britz |
| 2013/0031879 A1 | 2/2013 | Yoshikane et al. |

FOREIGN PATENT DOCUMENTS

| | | |
|---|---|---|
| CN | 1895148 A | 1/2007 |
| CN | 102670130 A | 9/2012 |
| CN | 102909697 A | 2/2013 |
| CN | 102958582 A | 3/2013 |
| CN | 103068290 A | 4/2013 |
| DE | 102008016956 | 10/2009 |
| DE | 102009038230 | 2/2011 |
| DE | 102010040094 | 3/2012 |
| EP | 2601876 A1 | 6/2013 |
| JP | 2935432 B2 | 8/1999 |

DUST REMOVAL SYSTEM FOR A HANDHELD POWER TOOL

The present invention relates to a dust removal system for a handheld power tool.

BACKGROUND

A dust removal system of the generic type is disclosed, for example, in German patent application DE 10 2010 040094 A1. The dust filter needs to be replaced often since it becomes clogged with dust.

SUMMARY OF THE INVENTION

The present invention provides a dust removal system for a handheld power tool having a fan to generate an air flow, a suction nozzle to capture dust-laden air from a tool, and a collecting container to collect the dust. The collecting container has a suction opening connected to the suction nozzle as well as an exhaust opening connected to the fan. A filter to separate dust into the collecting container is arranged so as to cover the exhaust opening. The filter has several consecutive fins arranged one beside the other in a direction (y) that is perpendicular to the direction (z) of the air flow. The fins are slanted towards each other. The slant of the fins reduces the adhesion of the dust to the fins.

One embodiment provides for the outermost fins to be slanted towards each other by 3° to 10°. The adjacent fins are supposed to be slanted towards each other. A slant of more than 10° appears to be sufficient. A greater slant causes not only a loss in performance but also requires more space.

One embodiment provides for the fins to be attached in a frame that can be bent in the direction (z) of the air flow and for the frame to be placed onto a pedestal that is convexly elevated opposite to the direction (z).

One embodiment provides for the end face of the filter that is exposed to the flow to be less than 10% larger than an end face of the filter facing away from the flow. The fan has to build up a pressure differential of several mbars relative to the suction nozzle. Since only a small motor can be employed for handheld devices, pressure losses should be avoided under all circumstances. Consequently, a cuboidal or virtually cuboidal structure is a must.

One embodiment provides for the pedestal to have a guide slanted in the direction (z) of the air flow, whereby one of the fins is placed onto said guide.

BRIEF DESCRIPTION OF THE DRAWINGS

The description below explains the invention on the basis of embodiments and figures given by way of examples. The figures show the following.

Unless otherwise indicated, identical or functionally equivalent elements are designated in the figures with the same reference numerals.

DETAILED DESCRIPTION

Figure 1:
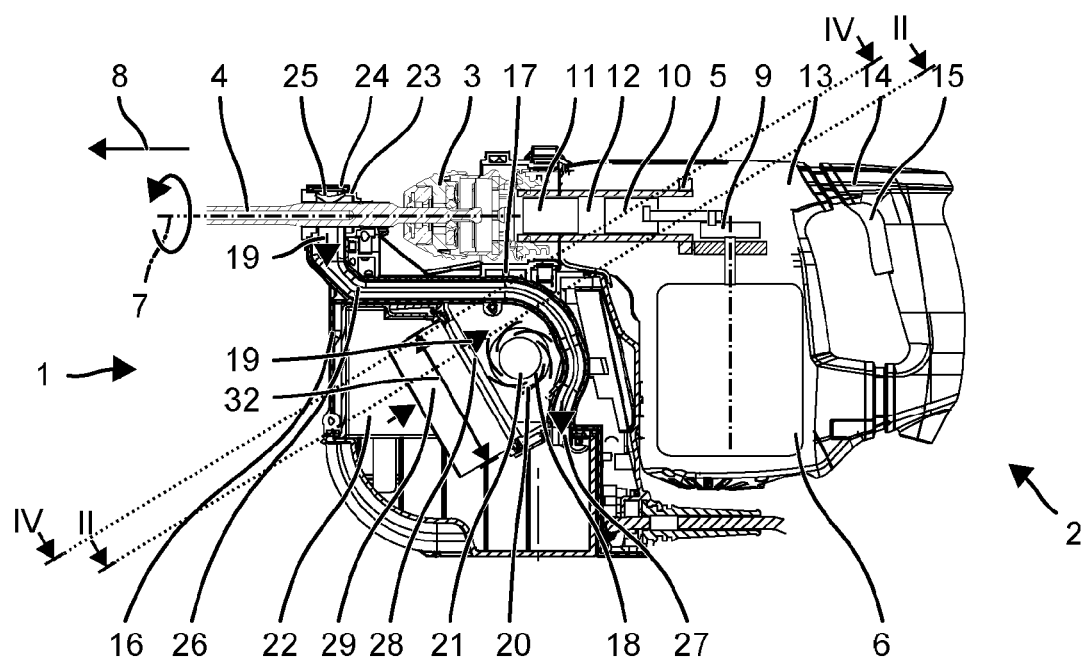
FIG. 1: a hammer drill with a dust removal system.

FIG. 1 shows a dust removal system 1 that is placed onto a hammer drill 2. By means of a chiseling drill bit 3, the hammer drill 2 creates holes in rock, concrete, etc. The dust removal system 1 captures the generated drill cuttings, particularly the fine dust, from the drilled hole.

The drill hammer 2 given by way of an example has a tool socket 4 into which the drill bit 3 can be inserted and locked in place. The tool socket 4 is coupled by a rotary drive 5 to a motor 6 that drives the tool socket 4 so that it rotates around a working axis 7. A pneumatic striking mechanism can strike the drill bit 3 along the working axis 7 in the working direction 8. The striking mechanism is likewise driven by the motor 6. The motor 6 drives an eccentric cam 9 that forces an exciter piston 10 to make a periodic back-and-forth movement. A striker 11 is coupled to the movement of the exciter piston 10 via an air cushion 12. The drive components are arranged in a machine housing 13. A handle 14 for holding and guiding the hammer drill 2 during operation can be attached to the machine housing 14, either rigidly or with damping. The user can start the motor 5 by means of a main switch 15.

The dust removal system 1 has a housing 16 with a holder 17. The user can attach the dust removal system 1 to the hammer drill 2 by means of the holder 17. The holder 17 comprises a movable journal, a pawl, a clamp, etc.

The dust removal system 1 has a fan 18 that generates an air flow 19. The housing 18 given by way of an example has an impeller 20 and an electric motor 21 that drives the impeller 20. The impeller 20 draws in air in the radial direction and blows the air out in the axial direction through appropriate openings in the housing 22.

A suction nozzle 23 of the dust removal system 1 is arranged in the direct vicinity of the drill bit 3. The suction nozzle 23 can have, for instance, a sleeve 24 that surrounds the drill bit 3. The sleeve 24 given by way of an example has a sealing gasket 25 that comes into contact with the drill bit 3. In the specific drill bit 3 shown here, the drill cuttings are drawn in inside the shank of the drill bit 3. In the case of conventional drill bits with a transport screw, the suction nozzle 23 preferably likewise surrounds the drill bit and, at the same time, is in contact with the workpiece.

The dust-laden air captured by the suction nozzle 23 is transported by the air flow 19 into a collecting container 22. The suction nozzle 23 is connected to a suction opening 27 of the collecting container 22 via a tube 26, a rigid pipe, a telescopic pipe or some other tubular conduit. The collecting container 22 has a flat outlet opening 28 that is completely covered by a filter 29. The fan 18 is situated downstream from the filter 29. The dust in the air flow 19 is separated at the filter 29 and is left behind in the collecting container 22. The air flow 19 that reaches the fan 18 is free of dust. The housing 30 of the collecting container 22 is configured so as to be air-tight so that the entire air flow 19 that enters via the suction opening 27 only exits via the outlet opening 28.

Figure 2:
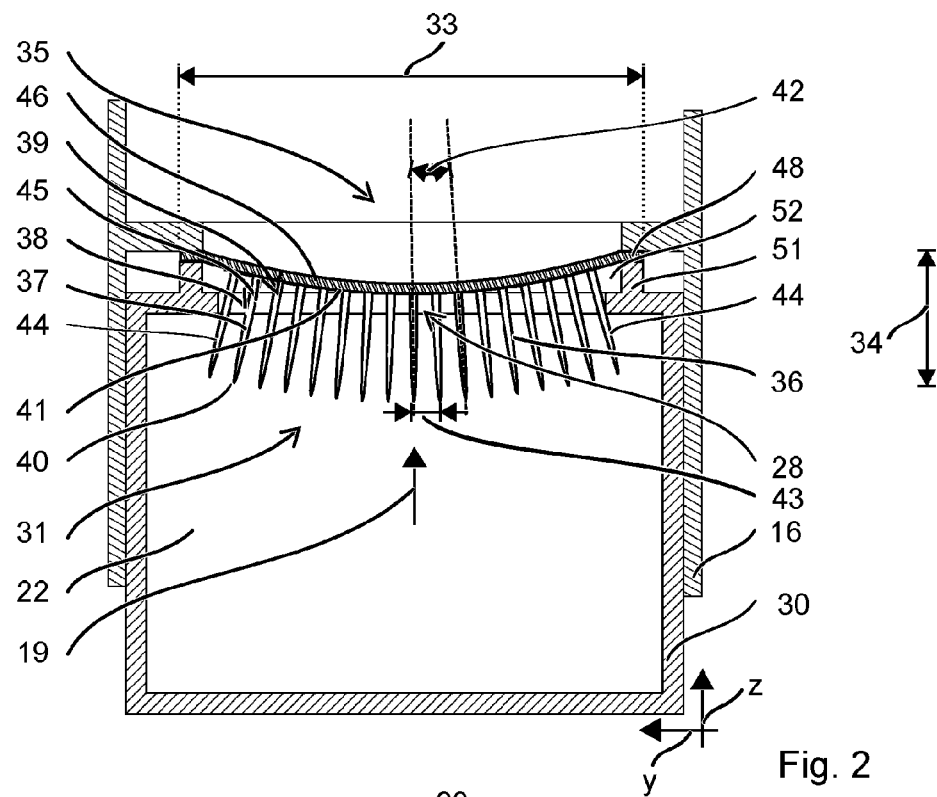
FIG. 2: a sectional view through the dust removal system in the plane II-II.
Figure 3:
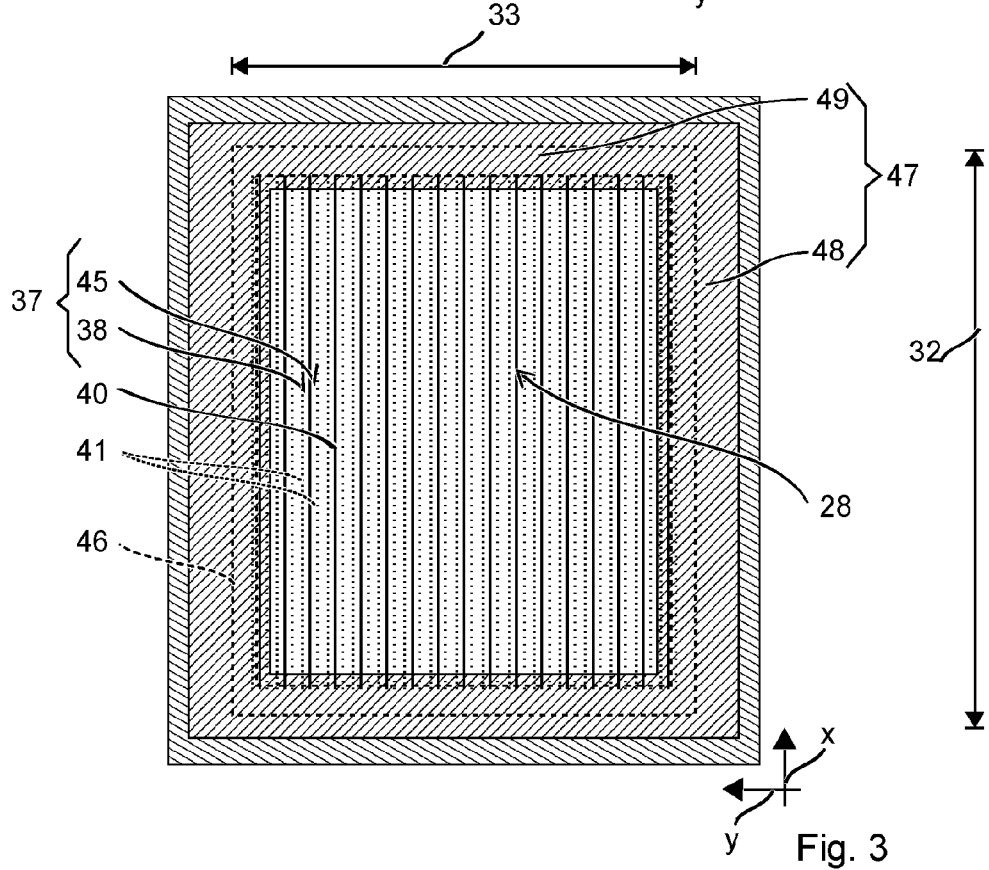
FIG. 3: a top view of a filter.

FIG. 2 shows the installed filter 29 given by way of an example, in a cross sectional view in the plane II-II. FIG. 3 shows a top view of the end face 31 of the filter 29 that is exposed to the flow. The filter 29 has an essentially cuboidal structure. The dimensions of the cube will be designated below as is usually done, namely, length 32, width 33 and height 34, while the appertaining axes are designated as the x-axis, y-axis and z-axis. An end face 31 that is exposed to the flow where the dust accumulates as well as an end face 35 facing away from the flow which remains virtually clean are positioned perpendicular to the z-axis and are essentially of the same size. The end faces 31, 35 equal the product of the length 32 and the width 33 of the filter 29. The deviation is less than 10%. These equal dimensions prevent a pressure drop.

The filter 29 has membrane 36 whose surface through which the flow passes is several times greater than the end faces 31, 35. The membrane 36 is made up of a plurality of fins 37, preferably all having the same design. The fins 37 consist essentially of two opposing flat sides 38. The sides 38 are made up of the permeable membrane 36, which has a pore size configured to capture the dust. The sides 38 are separated from each other by a thin conduit 39 that is configured so as to be flat. Dust-laden air can penetrate through the sides 38 while leaving the dust behind and the air can subsequently flow away in the conduit 39 between the sides 38. The sides 38 are preferably of the same size. The sides 38 are preferably either parallel to each other or else slanted with respect to each other by a small angle, less than 5°. The sides 38 are connected to each other at a head line 40. Adjacent fins 37 are each joined to each other by a foot line 41 of the sides 38.

The fins 37 are oriented parallel to each other relative to the x-axis, that is to say, the sides 38, the head lines 40 and the foot lines 41 are parallel to each other. The fins 37 are consecutive to each other in the y-direction, preferably without partially overlapping in this direction. The fins 37 are slanted at a small angle with respect to the z-axis, which will be elaborated upon below. The head lines 40 of the fins 37 face opposite to the air flow 19.

The fins 37 are oriented in a fanned pattern. The fins 37 are slanted towards each other. The slant 42 between the fins 37 is determined between the gravitational planes of their sides 38, or equivalently, the slant 42 is determined between the appertaining sides 38 that face in the same direction. The distance 43 between adjacent fins 37 decreases in the direction of the air flow 19. The slant 42 is not equal to zero between all adjacent fins 37, preferably, it is of the same magnitude. The two outermost fins 44 along the y-axis have a relative slant 42 within the range from 3° and 10°. Consequently, the flow comes in essentially from an axial direction.

The membrane 36 consists of a sheet of pleated paper or a pleated textile. The pores of the membrane 36 can advantageously have a mean size of less than 5 μm in order to capture dust. The sheet is folded several times in alternating opposite folding directions along fold lines that run parallel to the x-axis. The first side surface 38 of the fins results from a pleat in the folding direction while the second side 45 is the next pleat in the opposite direction. The two sides 38, 45 are joined along the fold line, which forms the head line 40 and, by the same token, the adjacent fins 37 are joined along a fold line that forms the foot line 41. The distance between the sides 38 of a fin 37 is smaller than the distance between two adjacent fins 37.

The filter 29 has a frame 46. The frame 46 joins the foot lines 41 along the y-axis. The membrane 36 cannot unfold any further. The height of the frame 46 is preferably considerably smaller than the height 34 of the pleated membrane 36. The edges 40 facing the flow are not fixed in the frame 46, but rather, they are movable. The preferred frame 46 is made of a flexible synthetic material, for example, rubber.

Figure 4:
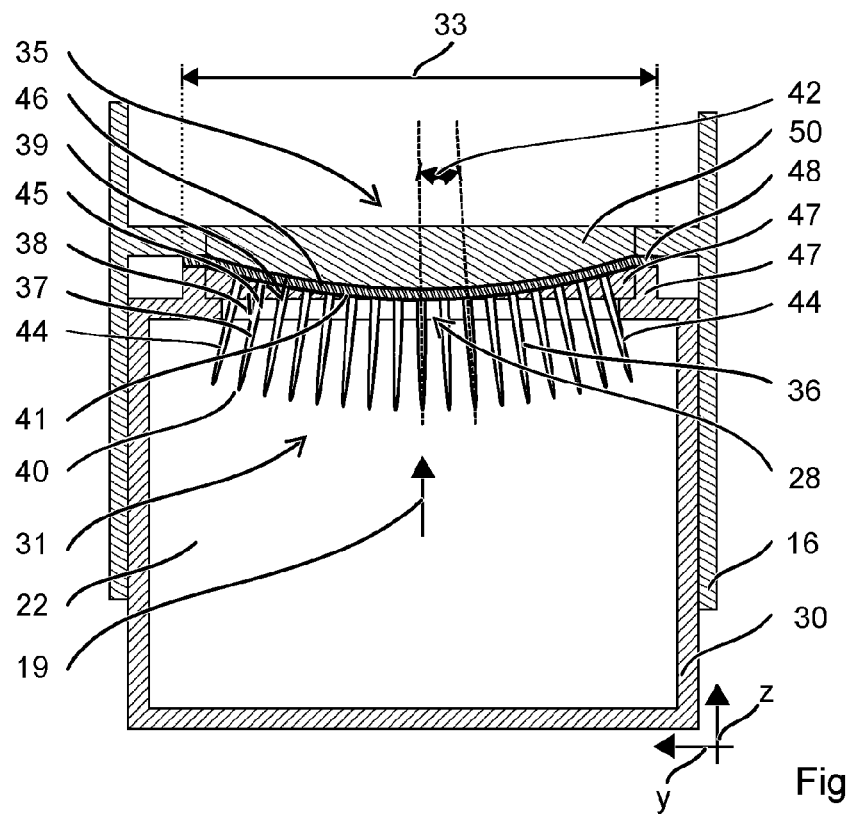
FIG. 4: a sectional view through the dust removal system in the plane IV-IV.

The outlet opening 28 of the collecting container 22 is covered by the filter 29. The outlet opening 28 has a frame-shaped pedestal 47 that surrounds the outlet opening 28. The frame 46 of the filter 29 rests against the pedestal 47 with a positive fit in order to prevent leaks. The frame-shaped pedestal 47 has first areas 48 that run along the x-axis, in other words, along the edges 40, 41 of the fins 44, and second areas 49 that run along the y-axis, in other words, essentially perpendicular to the fins 44. The first areas 48 are essentially rectilinear and formed so as to lie in a plane. The second areas 49 are concavely curved along the y-axis. The second area 49 is closer to the inside of the collecting container 22 in the center than at the edge (FIG. 4). The flexible frame 46 of the filter 29 that is pressed against the pedestal 47 is correspondingly deformed. Therefore, the edges 41 facing away from the flow are at different heights along the z-axis. The pleated membrane 36 spreads open in a fanned pattern; the fins 37 acquire the slant 42 relative to each other.

The housing 16 of the dust removal system 1 has a pedestal 50 that is opposite from the pedestal 47 of the collecting container 22. The frame 46 of the filter 29 is clamped between the two pedestals 47, 50. The pedestal 50 of the housing 22 has a convex section along the y-axis that is preferably complementary to the second area 49 of the pedestal 47 of the collecting container 22. In one embodiment, only the housing 22 is provided with a convexly curved pedestal 50.

Figure 5:
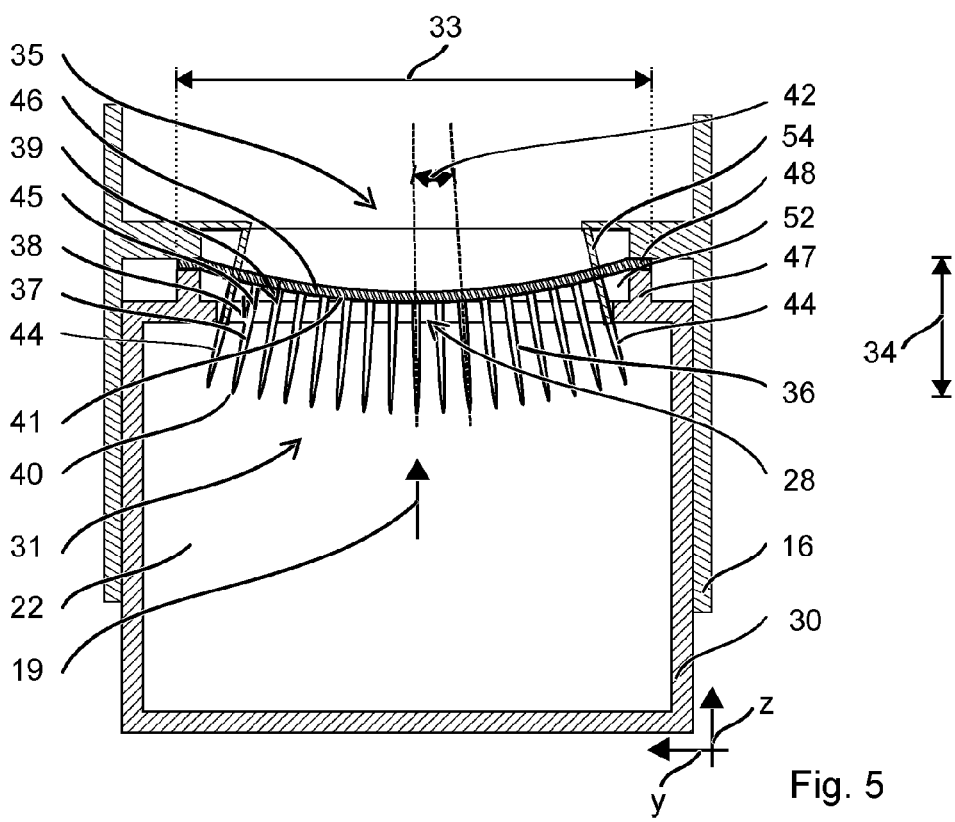
FIG. 5: a sectional view through a dust removal system in the plane II-II.

FIG. 5 shows another embodiment. The housing 22 is provided with guide plates 51. The guide plates 51 are slanted relative to the z-axis, equal to the slant 42 of the outermost fin or outer fins 44. The outer fins 44 with the conduit 39 are placed onto the guide plates 51. The guide plates 51 effectuate or assist the fan-like spreading of the membrane 36 consisting of the fins 37. A guide on the side facing away from the flow proves to be advantageous since the guide 51 does not offer any seed point for the accumulation of dust.

Figure 6:
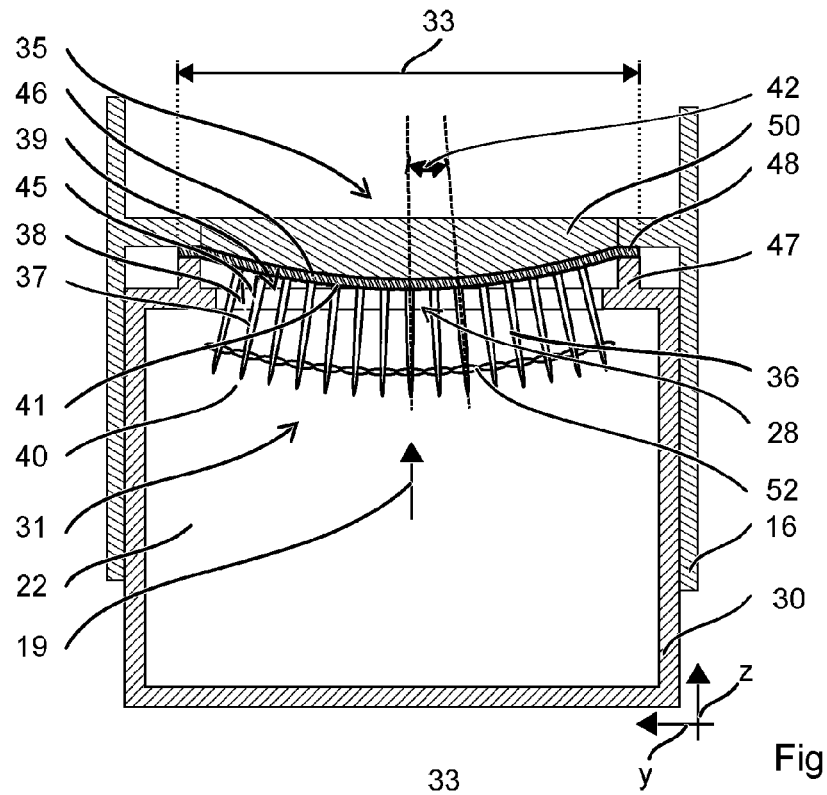
FIG. 6: a sectional view through another dust removal system in the plane II-II.
Figure 7:
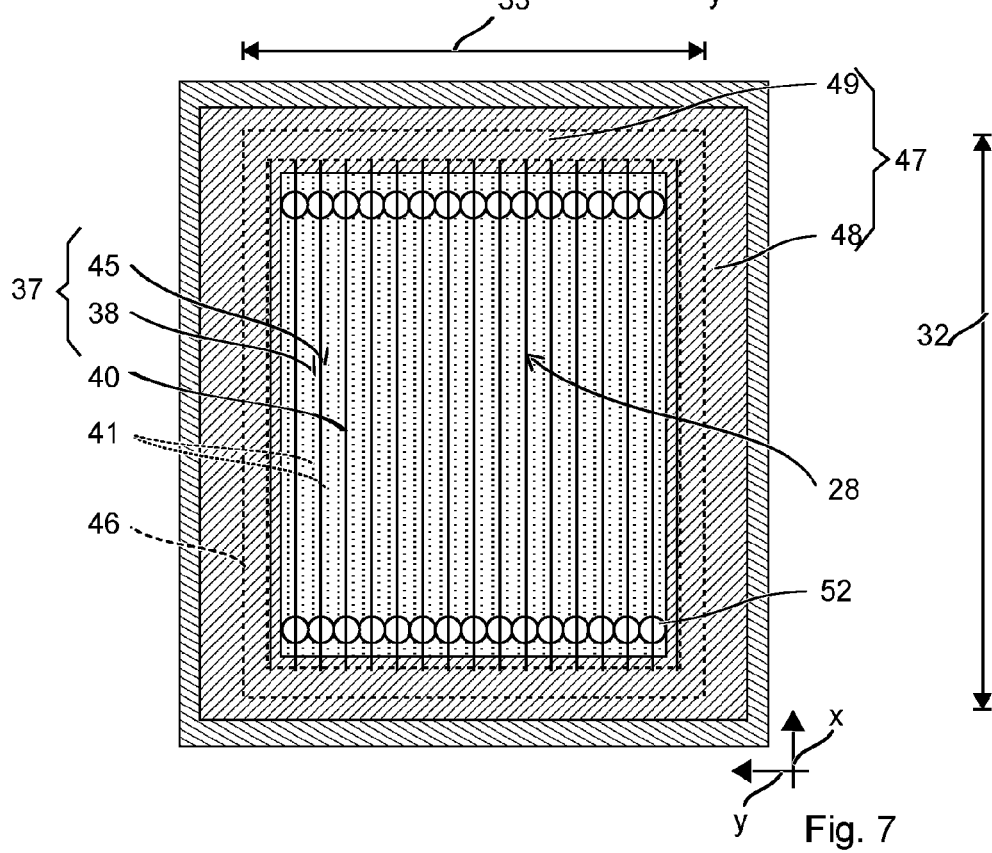
FIG. 7: a top view of the filter from FIG. 6.

FIGS. 6 and 7 show another embodiment. The fins 37 are provided with spacers 52. The spacers 52 are arranged on the head line 40. The spacers 52 have a dimension along the y-axis that is greater than the distance of the foot line 41. As a result, the head lines 40 are further apart from each other than the foot lines 41 in order to attain the desired fan-like spread. The spacers 52 can be placed onto the head lines 40 as an add-on. Preferably, the spacers 52 are embossed into the membrane 36 before the membrane 36 is pleated to form the fins 37.

What is claimed is:

1. A dust removal system for a handheld power tool, the dust removal system comprising:
   a fan to generate an air flow;
   a suction nozzle to capture dust-laden air from a tool;
   a collecting container to collect dust from the dust-laden air, the collecting container having a suction opening connected to the suction nozzle and an exhaust opening connected to the fan; and
   a filter serving to separate the dust into the collecting container, the filter arranged so as to cover the exhaust opening, the filter having several consecutive fins arranged one beside the other in a direction perpendicular to the direction of the air flow, the fins being slanted with respect to each other;
   wherein the fins are attached in a frame bendable in the direction of the air flow and the frame is placed on a pedestal convexly elevated opposite to the direction.

2. The dust removal system as recited in claim 1 wherein an end face of the filter exposed to the flow has a product of a length and a width of the filter at the end face less than 10% greater than another product of another length and another width of another end face of the filter facing away from the flow.

3. The dust removal system as recited in claim 1 wherein the pedestal has a guide slanted in the direction of the air flow, whereby one of the fins is placed onto the guide.

4. The dust removal system as recited in claim 1 wherein the outermost fins are slanted with respect to each other by 3 degrees to 10 degrees.

* * * * *